(12) United States Patent
Headen et al.

(10) Patent No.: US 6,827,228 B2
(45) Date of Patent: Dec. 7, 2004

(54) PLASTIC CONTAINER WITH DECORATIVE RECESSED FEATURES AND ASSOCIATED METHOD AND APPARATUS FOR MANUFACTURE THEREOF

(75) Inventors: Cynthia Ann Headen, Newtown, CT (US); Martin H. Beck, Amherst, NH (US); Dennis Connor, Merrimack, NH (US); Lydia Reed, Amherst, NH (US); John Boyet Stevens, Mason, OH (US); Charles A. Curtiss, Norwalk, CT (US); Stuart Leslie, Larchmont, NY (US)

(73) Assignee: PepsiCo., Inc., Purchase, NY (US)

( * ) Notice: Subject to any disclaimer, the term of this patent is extended or adjusted under 35 U.S.C. 154(b) by 0 days.

(21) Appl. No.: 10/216,410

(22) Filed: Aug. 8, 2002

(65) Prior Publication Data
US 2004/0026355 A1 Feb. 12, 2004

(51) Int. Cl.$^7$ ................................................ B65D 1/40
(52) U.S. Cl. ...................... 215/383; 215/379; 215/382; 220/669; 220/675
(58) Field of Search .................... 215/379, 381–384; 220/666, 669, 675; D9/530, 542

(56) References Cited

U.S. PATENT DOCUMENTS

| | | | | |
|---|---|---|---|---|
| 3,325,031 A | * | 6/1967 | Gregoire Singier | ......... 215/247 |
| D331,017 S | * | 11/1992 | Chan | ........................... D9/560 |
| 5,261,543 A | * | 11/1993 | Ugarelli | ....................... 215/375 |
| 5,279,433 A | * | 1/1994 | Krishnakumar et al. | .... 215/381 |
| 5,303,834 A | * | 4/1994 | Krishnakumar et al. | .... 215/381 |
| 5,407,086 A | * | 4/1995 | Ota et al. | ..................... 215/383 |
| D400,106 S | * | 10/1998 | Anderson et al. | ............ D9/551 |
| D423,940 S | * | 5/2000 | Chimetto | ...................... D9/541 |
| 6,311,861 B1 | * | 11/2001 | Policappelli | ................. 220/669 |
| D458,142 S | * | 6/2002 | Schuller et al. | .............. D9/560 |
| 6,554,146 B1 | * | 4/2003 | DeGroff et al. | ............. 215/381 |
| 6,585,125 B1 | * | 7/2003 | Peek | .......................... 215/381 |

OTHER PUBLICATIONS

U.S. patent application Publication No. 2003/0010744 A1 to Ma et al, Published Jan. 2003.*
U.S. patent application Publication No. 2001/0030166 A1 to Ozawa et al, Published Oct. 2001.*

* cited by examiner

*Primary Examiner*—Sue A. Weaver
(74) *Attorney, Agent, or Firm*—Davis & Bujold, P.L.L.C.

(57) ABSTRACT

A bubble 6 formed in the wall 7 of a plastic container having, an interior surface 8, an exterior surface 9 and a wall thickness 29 and being suitable for containing a liquid under pressure e.g., a carbonated beverage, including an integral structure formed of a central dome 10 having a convex outer surface 11 facing toward the adjacent exterior surface 9 and connected with an annular trough 18 having an annular concave surface facing the adjacent the exterior surface 9, a frustum 20 interconnecting the trough 18 with the dome or an outer ring of curved cross-section, the outer ring having an annular concave surface facing toward the interior 14, integrally formed with the container wall 7 surrounding the bubble, the bubble having a thickness approximately equal to the wall thickness. An associated container, blow mold and method are also included.

15 Claims, 5 Drawing Sheets

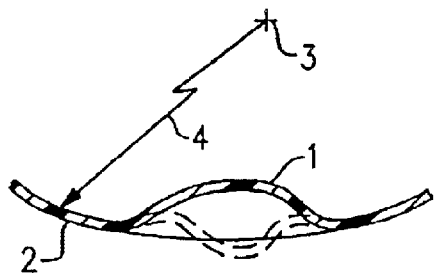
FIG. 1
Prior Art
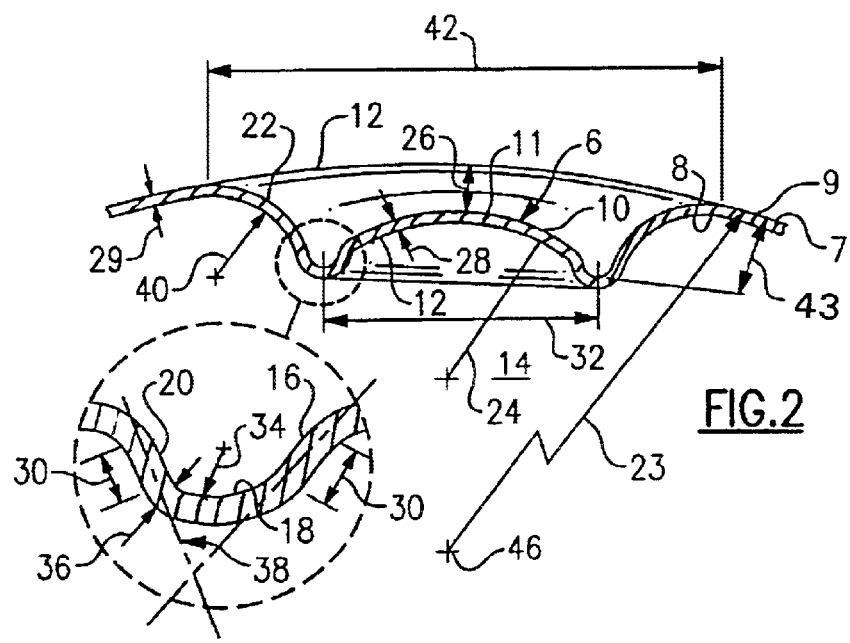
FIG. 2
FIG. 2A
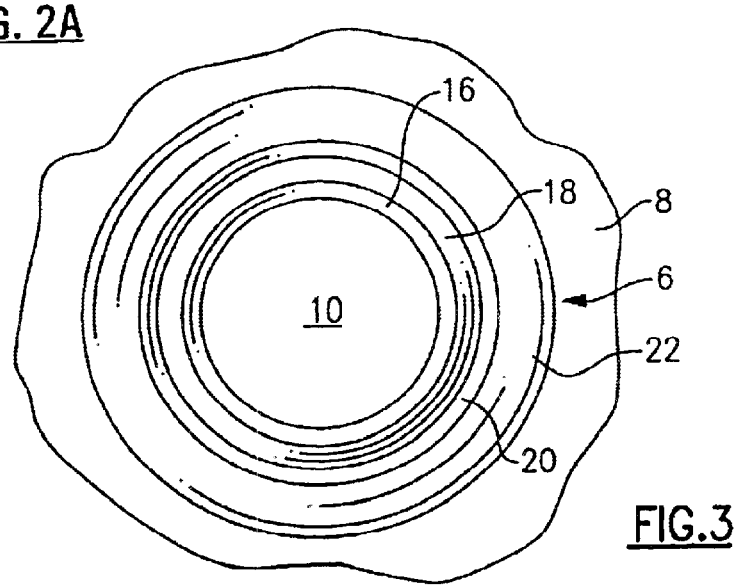
FIG. 3

PLASTIC CONTAINER WITH DECORATIVE RECESSED FEATURES AND ASSOCIATED METHOD AND APPARATUS FOR MANUFACTURE THEREOF

FIELD OF THE INVENTION

This invention relates to decorative features (recessed bubbles) for carbonated beverage containers (e.g. bottles) made of a plastic and to methods and apparatus for producing such containers.

DEFINITIONS

"Plastic" is a polymerizable material that can be bi-axially oriented, e.g. polyethylene terephthalate (PET), polypropylene (PP) and acrylonitrile (AN) suitable for use in containers for liquid under pressure e.g., carbonated beverages.

"PET" as used herein shall be construed as including all materials defined hereinbefore as "Plastic".

"Bubble" as used herein is a circular, decorative feature formed by a deformation of the wall, which includes a shoulder, of a plastic container which does not extend outwardly (relative to the axis of the container) from the exterior surface of the container even when the container contains a liquid under pressure e.g. a carbonated beverage and is exposed to industry defined test procedures for such containers including exposure to stresses resulting from pressure and elevated temperatures during filling, packaging, distribution, sale and the end user actions.

"Circular" as used herein with respect to bubbles shall be construed to include ovals, ellipses, teardrops and other rounded shapes as well as circular shapes.

"Container" as used herein shall be construed to include plastic bottles.

"Frustum" as used herein shall be construed as a truncated hollow right circular cone in which the apex is replaced by a plane section parallel to the cone base and which has parallel inner and outer surfaces and shall be construed to include a hollow cylinder which has parallel inner and outer surfaces.

BACKGROUND OF THE INVENTION

PET for carbonated beverage containers has been used for many years. Many different shapes have been and are used to establish distinction between various brands of products. Some of these are decorative features formed in the surface of the container including ribs and swirls. Such decorative features may project inwardly and/or outwardly from the exterior surface of the container.

Generally $CO_2$ is used for carbonated soft drinks but other gases such as $N_2$ are also used to pressurize a plastic container. When the filled containers are exposed to typical service conditions especially higher than room temperature conditions, the pressure within the container increases while the plastic softens. This leads to creep (the plastic flows and distorts the container shape). One of the disadvantages of prior art decorative designs is that the PET will creep when exposed to excessive pressures and temperatures and many of the features will become distorted or even obliterated due to this creep. The desired distinctive features, particularly recessed features are then lost.

One attempt at producing a circular decorative feature is illustrated by the dimple 1, shown in FIG. 1 in an unpressurized state. In FIG. 1 a container 2 defines a longitudinal axis 3 and a wall radius 4. This dimple tends to invert and/or distort upon pressurization to a form such as that shown dashed in FIG. 1. This invention can be avoided by providing a thickened wall in the region of the dimple. This is, however, an undesirable solution due to the significant increase in material costs resulting from the additional material used, particularly when there is a substantial plurality of such dimples forming a distinctive pattern on the bottle. Inversions of the dimple is particularly undesirable because of resulting handling problems, labeling problems and questions of aesthetic appearance.

OBJECTS OF THE INVENTION

An object of the present invention is to provide a plastic container having at least one stable bubble, in a wall thereof, which does not extend outwardly from that wall especially when the container is pressurized e.g., by a carbonated beverage.

A further object of the present invention is to provide a blow mold design for producing a blow molded plastic container having at least one stable bubble, in a wall thereof, which does not extend outwardly from that wall.

Another object of the present invention to provide a method of producing a plastic container having at least one stable bubble, in a wall thereof, which does not extend outwardly from that wall.

SUMMARY OF THE INVENTION

According to the invention there is provided a bubble 6 formed in a wall 7 of a plastic container, the wall 7 defining an interior 14 of the container and having an interior surface 8, an exterior surface 9 and a wall thickness 29, the container being suitable for containing a liquid under pressure and the bubble comprising an integral structure having a central dome 10 defining a convex outer surface 11 facing toward an adjacent portion of the exterior surface 9, an annular trough 18 connected with the central dome 10, an outer ring 22 of curved cross-section and a first frustum 16 or 20 interconnected with the trough 18 and one of the central dome 10 and the outer ring 22, the annular trough 18 having an annular concave surface facing the adjacent portion of the exterior surface 9 and the outer ring having an annular concave surface facing toward the interior 14 of the container, to join, integrally, the bubble to the container wall 7 surrounding the bubble, the bubble having a thickness about equal to the wall thickness 29.

Preferably, the other of the central dome 10 and the outer ring 22 is connected to the trough 18 by way of a second frustum 16.

Also according to the invention there is provided a plastic container suitable for containing a liquid under pressure, comprising at least one bubble 6, formed in a wall 7 of the plastic container, the wall 7 defining an interior 14 of the container and having an interior surface 8, an exterior surface 9 and a wall thickness 29, the bubble comprising an integral structure having a central dome 10 defining a convex outer surface 11 facing toward an adjacent portion of the exterior surface 9, an annular trough 18 connected with the central dome 10, an outer ring 22 of curved cross-section and a first frustum 16 or 20 interconnected with the trough 18 and one of the central dome 10 and the outer ring 22, the annular trough 18 having an annular concave surface facing the adjacent portion of the exterior surface 9 and the outer ring having an annular concave surface facing toward the interior 14 of the container, to join, integrally, the bubble to the container wall 7 surrounding the bubble, the bubble having a thickness about equal to the wall thickness 29.

Preferably, the other of the central dome 10 and the outer ring 22 is connected to the trough 18 by way of a second frustum 16.

In addition, the invention provides a blow mold for blow molding a plastic container for containing a liquid under pressure, comprising at least one bubble 6 formed in a wall 7 of the plastic container, the wall 7 defining an interior 14 of the container and having an interior surface 8, an exterior surface 9 and a wall thickness 29, the bubble comprising an integral structure having a central dome 10 defining a convex outer surface 11 facing toward an adjacent portion of the exterior surface 9, an annular trough 18 connected with the central dome 10, an outer ring 22 of curved cross-section and a first frustum 16 or 20 interconnected with the trough 18 and one of the central dome 10 and the outer ring 22, the annular trough 18 having an annular concave surface facing the adjacent portion of the exterior surface 9 and the outer ring having an annular concave surface facing toward the interior 14 of the container, to join, integrally, the bubble to the container wall 7 surrounding the bubble, the bubble having a thickness about equal to the wall thickness 29.

Preferably the other of the central dome 10 and the outer ring 22 is connected to the trough 18 by way of a second frustum 16. Also preferably the blow mold comprises a first annular projection 48 having an outer extremity 50 and adjacent side surfaces complimentary to the trough and first frustum 20. In addition annular projections having outer extremities and adjacent side surfaces are complimentary to the first and second frustums 20 and 16.

Further the invention provides a method of producing a bubble 6, in a plastic container suitable for containing pressurized liquids, which does not, in use, extend outwardly from the exterior surface of the container, comprises:

a) providing a blow mold 44 having an axis 46 and bubble forming features in the form of an annular projection extending toward the axis 46 of the mold cavity and container to be formed, the annular projection having an outer extremity and adjacent side surface complimentary to a trough 18 or 66 and a frustum 16, 20;
b) pre-heating a preform to facilitate blow molding to form the container and the bubble;
c) introducing the preform into the blow mold;
d) applying a gas at a pressure sufficient to inflate and deform the preform into contact with the mold cavity to form the container and into contact with bubble forming features to produce the bubble at least one of a wall and shoulder of the container, the bubble being formed failing to contact the mold cavity in the region of a central dome 10 and a substantial portion of an outer ring 22 of the bubble;
e) cooling the container; and
f) removing the container with the bubble(s) formed therein from the blow mold cavity.

BRIEF DESCRIPTION OF THE DRAWINGS

The invention will now be described, by way of example, with reference to the accompanying drawings, in which:

FIG. 1 is a cross-section prior art design of a decorative dimple;

FIG. 2 is a cross-section of a bubble of a first embodiment of the present invention; and FIG. 2A is an enlarged cross-section view of the circled portion of the bubble shown in FIG. 2;

FIG. 3 is an elevation of the bubble of FIG. 2 with solid lines used to clarify the boundaries of structural elements of the bubble;

DETAILED DESCRIPTION OF THE INVENTION

Figure 4:
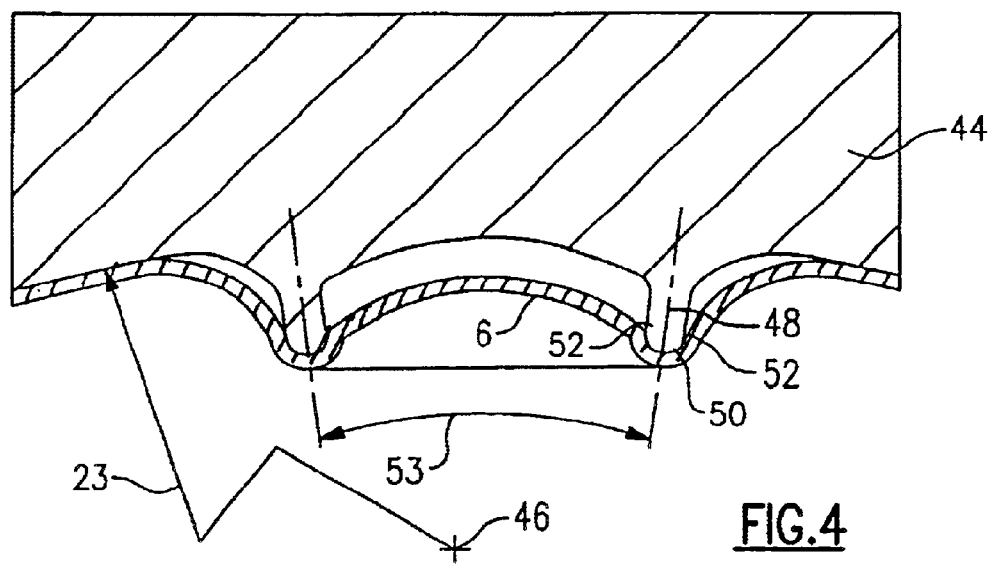
FIG. 4 is a cross-section of the bubble of FIG. 2 and of a portion of a blow mold for producing this bubble.

Referring first to FIGS. 2 and 3, a bubble 6 of the first embodiment, formed in the wall 7 of container, having an interior surface 8 and an exterior surface 9, blow molded from a conventional preform of PET, is an integral structure composed of a circular central dome 10 smoothly connected to an inner frustum 16 increasing in diameter to an annular trough 18 which in turn is smoothly connected to an outer frustum 20 increasing in diameter to an annular outer ring 22 smoothly interconnecting the outer frustum 20 to the wall 7 of the container.

The central dome 10 has a convex outer surface 11 extending toward the adjacent exterior surface 9 of the container wall 7 and a concave inner surface 12 parallel to the convex outer surface 11 and facing the interior 14 of the container.

The following dimensions are without a pressurized interior of the container and without the container being exposed to an elevated temperature substantially above ambient room temperature. In addition, the following dimensions relate to a bubble formed in a container having a radius in a range of about 1.1 inches to about 1.6 inches, preferably about 1.3 inches. A typical central dome 10 has a radius 24 of the concave surface in a range of from about 0.16 of an inch to about 0.45 of an inch, more preferably from about 0.19 of an inch to about 0.32 of an inch, and most preferably about 0.23 of an inch, a diameter of about 0.25 of an inch, a radial spacing 26 from the outer extremity of the convex outer surface 11 to the exterior surface 9 of the wall 7 of the container in a range of about 0.01 of an inch to about 0.03 of an inch, preferably about 0.013 of an inch and a thickness 28 approximately equal to the wall 8 thickness 29 of the container, for example, of about 0.013 of an inch. Wall thicknesses 29 are preferably in a range from about 0.010 of an inch to about 0.015 of an inch, but should not be construed as being limited to this range.

A typical inner frustum 16 has a straight longitudinal dimension (length) 30 in cross-section in a range of about 0.003 of an inch to about 0.05 of an inch and preferably has a length of at least 0.005 of an inch and a thickness approximately equal to the thickness 29 of the wall 7. Although the presence of the inner frustum 16 and the outer frustum 20 is preferred and enhances the stability of the bubble 6, one of the frustums 16 and 20 may be omitted.

A typical annular trough 18 has a diameter 32 of about 0.3 of an inch and an internal radius 34 in cross-section in a range of from about 0.005 of an inch to about 0.05 of an inch with a preferred radius of about 0.015 of an inch. The thickness 36 of the trough 18 wall in cross-section is approximately equal to the thickness 29 of the wall 7. The radial spacing 43 of the inner surface (the surface facing the exterior surface 9 of the container) of the trough from the exterior surface 9 of wall 7 is in a range of from about 0.07 of an inch to about 0.15 of an inch, preferably about 0.1 of an inch.

A typical outer frustum 20 has the same dimensions and ranges of dimensions specified above for the inner frustum 16. The included angle 38 of the cross-sections of the frustums 16 and 20 is in the range of about 65° to about 80°, preferably about 73°.

A typical outer ring 22 has a radius 40 in cross-section in a range of from about 0.09 of an inch to about 0.13 of an inch, preferably about 0.11 of an inch, and a wall thickness in cross-section approximately equal to the wall thickness 29 of wall 7.

The diameter 42 of the bubble 6 is preferably in a range of from about 0.100 of an inch to about 0.500 of an inch. The above dimensions are chosen to allow formation of a bubble 6 having a diameter at or close to the maximum diameter of 0.500 of an inch.

It will be appreciated that the choice of actual dimensions for the features of the bubble 6 will be chosen to produce smooth transitions to between the various elements 10, 16, 18, 20 and 22 making up the bubble 6 and to the wall 7.

Now referring to FIG. 4 a fragmentary portion of a blow mold 44 illustrates the blow mold features which form the bubble 6 during a blow molding of a convention PET preform into a container. The fragmentary portion of the blow mold is a cross-section taken normal to the longitudinal axis 46 of the blow mold and the container. The blow mold features include an annular projection 48 terminating at its outer extremity 50 in a radius in cross-section to form the internal radius of the trough 18 and providing side surfaces 52 to form the inner and outer frustums 16, 20 of the bubble 6. The annular projection decreases in diameter toward the outer extremity 50 with an included angle 53 of approximately 10°.

The provision of this inwardly decreasing diameter of the projection 48 facilitates the formation of the trough 18 and frustums 16, 20 and eases removal of the container with formed bubble(s) from the blow mold.

It is to be noted that the blow molding is achieved by applying a pressure to the interior of a conventionally pre-heated preform sufficient (about 400 p.s.i. or greater) to inflate and deform the preform into engagement with the blow mold and its bubble forming features. However, it should also be noted that while the cylindrical wall 7 of the container intimately contacts the wall forming portion of the blow mold the bubble 6, being formed, contacts only the outer extremity 50 and the side surfaces 52 adjacent this outer extremity.

Figures 5A, 5B:
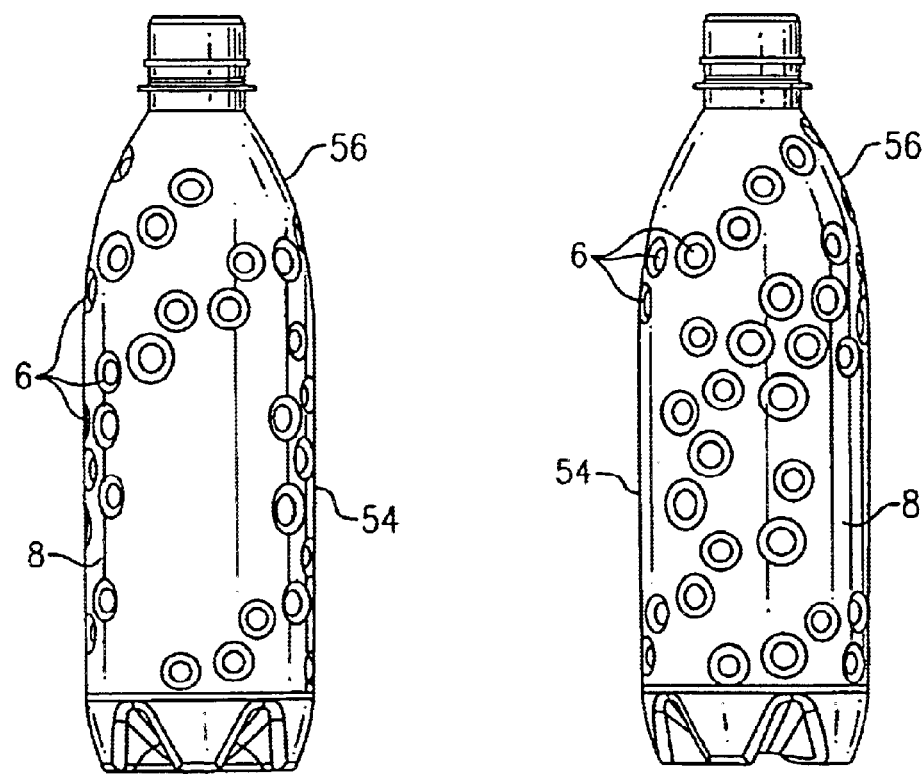
FIGS. 5a and 5b are elevations of a plastic container incorporating a decorative pattern of bubbles according to the present invention.

FIGS. 5*a* and 5*b* show two elevations, taken at 90° to one another, of a PET footed container 54, according to the invention, with a decorative pattern of bubbles 6 formed in a wall 7 and a shoulder 56 thereof.

As previously mentioned the bubbles do not extend outwardly of the container and are preferable recessed relative to the exterior surface of the wall 7 (and shoulder 56) even when the container filled with a carbonated beverage or other pressurized liquid is subjected to elevated temperatures and mechanical stresses in accordance with industry standards.

Figure 6:
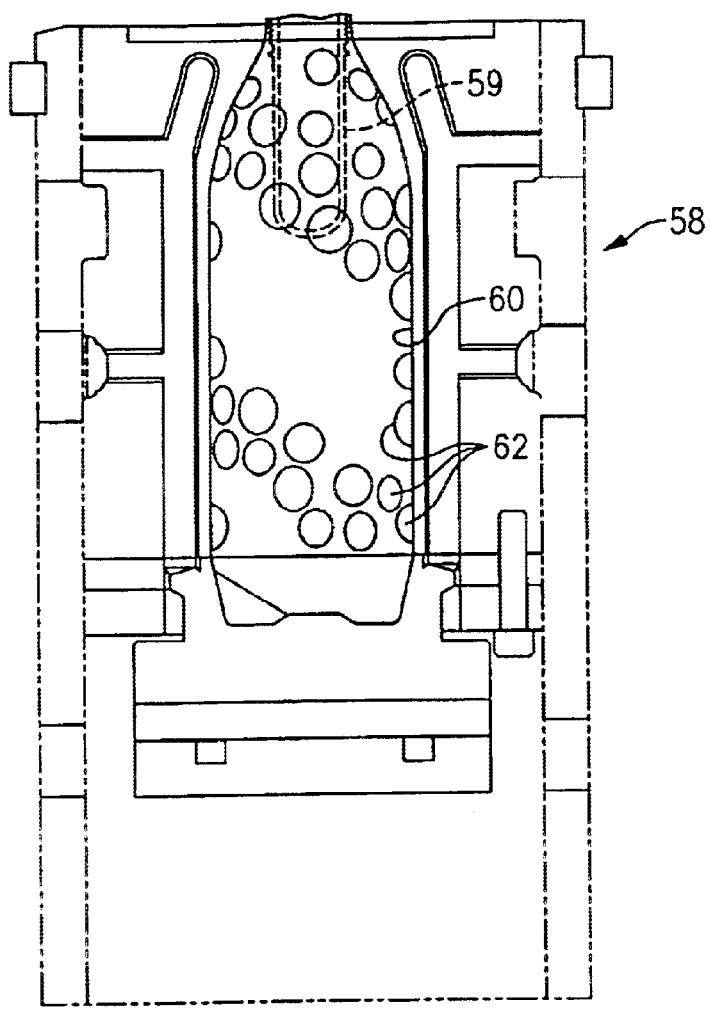
FIG. 6 is a longitudinal cross-section of a blow mold for producing the container of FIG. 5.

FIG. 6 is a cross-section of a blow mold 58 having a blow mold cavity 60 defining bubble forming features 62, as illustrated in FIG. 4, for producing the container 54 of FIGS. 5*a* and 5*b* with a decorative pattern of a plurality of bubbles 6.

Figure 7:
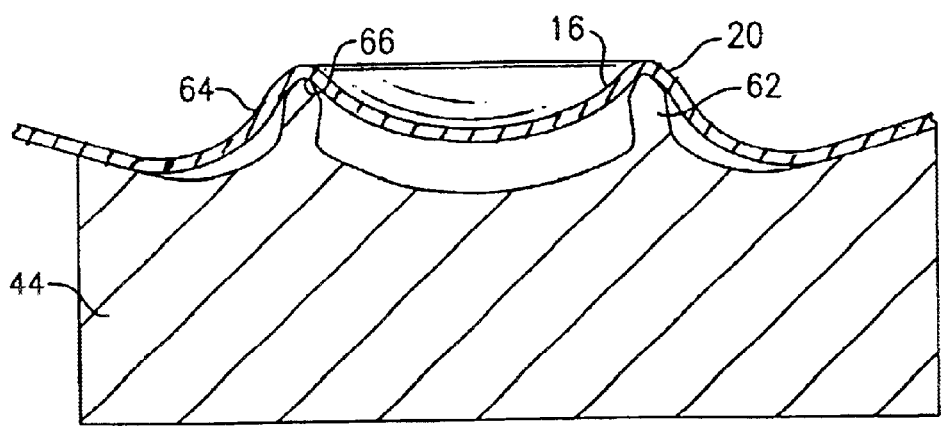
FIG. 7 is a longitudinal cross-section of a bubble of a second embodiment of the present invention and a portion of a blow mold for producing this bubble.
Figure 8:
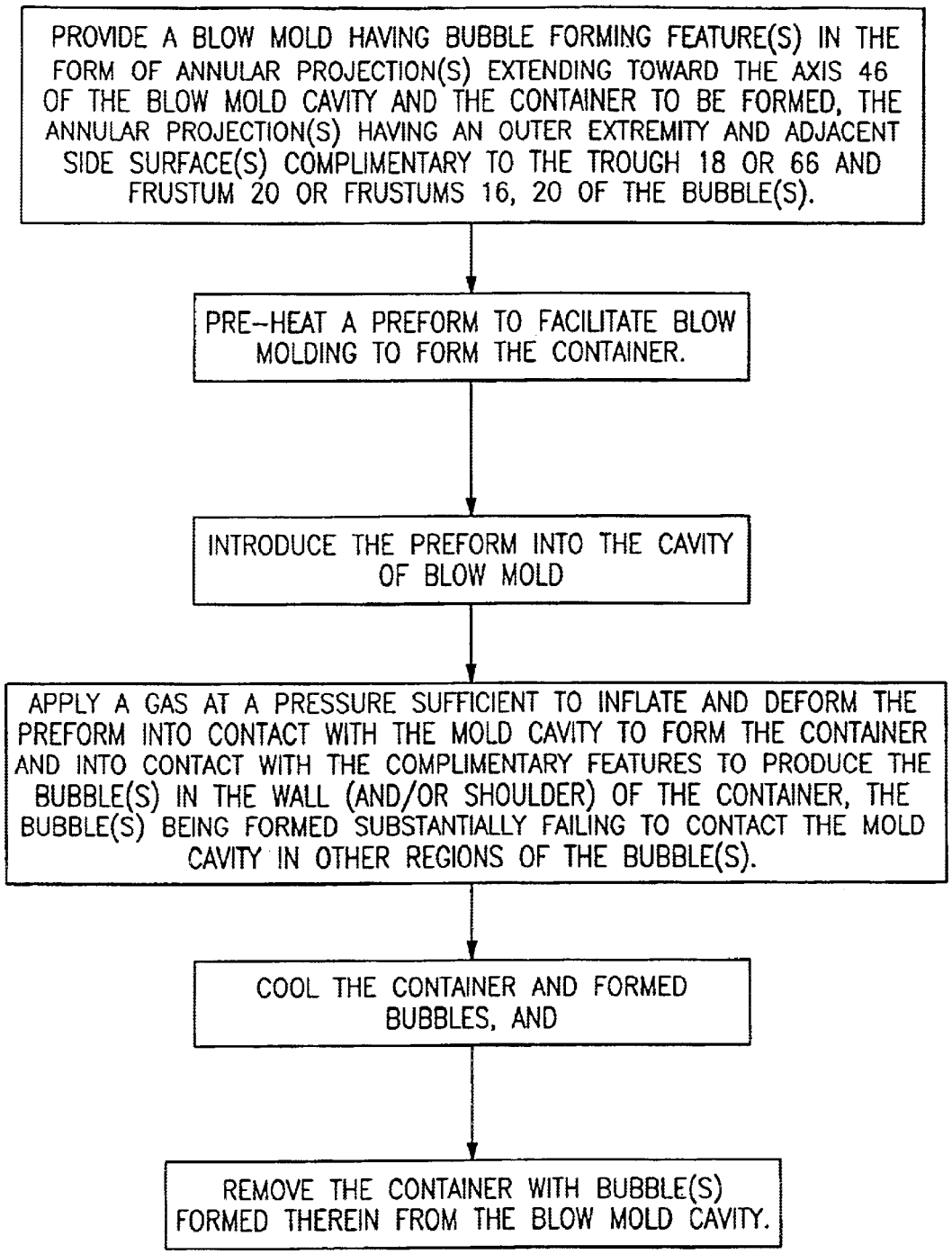
FIG. 8 is a block diagram illustrating the method of the present invention.

FIG. 7 illustrates a second embodiment of a bubble 64 according to the present invention in which the trough 18 is replaced by a trough 66 having a very small radius or a non-existent internal surface joining the frustums 16 and 20. The portion 44 of the blow mold shown in FIG. 7 has an annular projection 68 having an outer extremity which is complimentary to the form of the trough 66.

In order to avoid distortion (e.g. bridging or gullies) of the container between bubbles, it is preferred that bubble spacing exceed 0.100 of an inch from bubble perimeter to bubble perimeter.

The method of the present invention to produce a bubble (s), in the wall of a container for pressurized liquids (e.g. a carbonated beverage) which, even under acceptable elevated temperatures and mechanical stresses acceptable to the industry (i.e. the carbonated beverage industry), does not distort or extend outwardly from the exterior surface of the container, comprises:

a) providing a blow mold having bubble forming feature (s) in the form of annular projection(s) extending toward the axis 46 of the mold cavity and container to be formed, the annular projection(s) having an outer extremity and adjacent side surface(s) complimentary to the trough 18 or 66 and frustums 16, 20 respectively b) pre-heating a preform to facilitate blow molding to form the container and bubble(s);

c) introducing the preform into the blow mold;

d) applying a gas at a pressure sufficient (about 400 p.s.i. or greater) to inflate and deform the preform into contact with the mold cavity to form the container and into contact with the complimentary features to produce the bubble(s) in the wall (and/or shoulder) thereof, the bubble(s) being formed failing to contact the mold cavity in the region of the/their central dome(s) 10 and a substantial portion of the outer ring(s) 22;

e) cooling the container; and f) removing the container with bubble(s) formed therein from the blow mold cavity.

Figure 9:
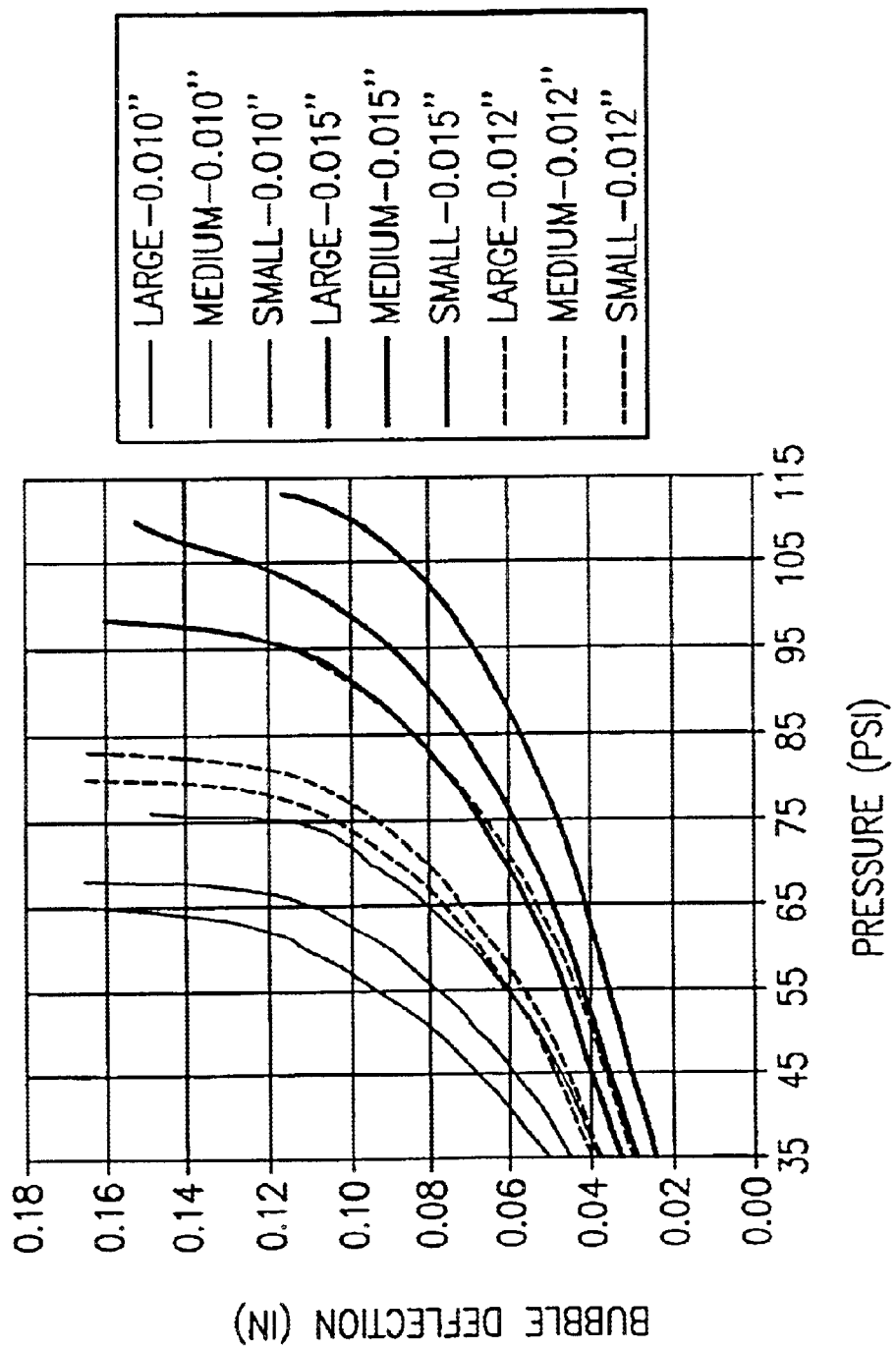
FIG. 9 is bubble deflection versus pressure graph for various bubbles of the present invention.

FIG. 9 is a graphical representation of PET bubble deflection, against internal pressure in the container, for three bubble diameters (large, medium and small), for example, 0.500 of an inch, 0.300 of an inch and 0.150 of an inch, each with three wall thicknesses, namely, 0.010 of an inch, 0.0125 of an inch and 0.015 of an inch with an arbitrary failure mode being defined as 0.10 of an inch of deflection. The failure mode is defined as a deflection outwardly of the container sufficient for the bubble to project outwardly beyond the radius of the container wall 7 or for a portion of the trough invert or kink.

Although described with reference to pressurized liquids e.g., carbonated beverages, it will be appreciated that the container described would exhibit the same appearance characteristics when unpressurized.

| Reference Numbers | |
|---|---|
| 1 | dimple |
| 2 | bottle wall |
| 3 | longitudinal axis |
| 4 | wall radius |

-continued

| Reference Numbers | |
|---|---|
| 6 | bubble |
| 7 | wall |
| 8 | interior surface |
| 9 | exterior surface |
| 10 | dome |
| 11 | convex outer surface |
| 12 | concave inner surface |
| 14 | interior |
| 16 | inner frustum |
| 18 | trough |
| 20 | outer frustum |
| 22 | outer ring |
| 23 | container radius |
| 24 | radius of central dome |
| 26 | radial spacing |
| 28 | central dome thickness |
| 29 | container wall thickness |
| 30 | inner and outer frustum length |
| 32 | trough diameter |
| 34 | trough internal radius |
| 36 | trough thickness |
| 38 | included angle of frustums |
| 40 | outer ring radius |
| 42 | bubble diameter |
| 43 | radial spacing |
| 44 | blow mold |
| 46 | axis |
| 48 | annular projection |
| 50 | outer extremity |
| 52 | side surfaces |
| 53 | including angle |
| 54 | container |
| 56 | shoulder |
| 58 | blow mold |
| 59 | preform |
| 60 | cavity |
| 62 | bubble forming features |
| 64 | bubble |
| 66 | trough |

What is claimed is:

1. A bubble (6) formed in a wall (7) of a plastic container, the container wall (7) defining an interior (14) of the container and having an interior surface (8), an exterior surface (9) and a wall thickness (29), and being suitable for containing a liquid under pressure, the bubble (6) comprising:

a central dome (10) defining a convex outer surface (11) recessed below the exterior surface (9) of the container (7), the convex outer surface (11) facing toward an adjacent portion of the exterior surface (9) of the container wall (7) surrounding the bubble (6);

an annular trough (18) surrounding the central dome (10), the annular trough (18) having an annular concave surface facing the adjacent portion of the exterior surface (9) of the container wall (7) and being recessed below the central dome (10);

an annular outer ring (22) surrounding the annular trough (18) and connected to the container wall (7) surrounding the bubble (6), the annular outer ring (22) having an annular concave surface facing toward the interior (14) of the container (7);

a first frustum (16 or 20) connected between one of the central dome (10) and the annular trough (18) and the annular outer ring (22) and the annular trough (18); and the bubble (6) including the central dome (10), the annular trough (18), the annular outer ring (22) and first frustum (16 or 20) being integral with the container wall (7) and having a wall thickness generally equal to the thickness (29) of the container wall (7) whereby the bubble is resistant to deformation.

2. The bubble of claim 1 wherein the other of the central dome (10) and the outer ring (22) is connected to the trough (18) by way of a second frustum (16).

3. The bubble of claim 2 wherein the central dome (10), first and second frustums (16 and 20), outer ring and the container wall (7) smoothly blend together.

4. The bubble of claim 2 wherein the second frustum (16) has a straight longitudinal dimension in a range of from about 0.003 of an inch to about 0.05 of an inch.

5. The bubble of claim 4 wherein the dimension is at least 0.005 of an inch.

6. The bubble of claim 1 wherein the first frustum (20) has a straight longitudinal dimension in a range of from about 0.003 of an inch to about 0.05 of an inch.

7. The bubble of claim 6 wherein the dimension is about 0.005 of an inch.

8. The bubble of claim 1 wherein the concave cross-section of the trough (18) defines a cross-sectional surface having a radius of from about 0.005 of an inch to about 0.05 of an inch.

9. The bubble of claim 8 wherein the radius is about 0.015 of an inch.

10. The bubble of claim 1 wherein the radial spacing between the central dome (10) and the adjacent exterior surface (9) is about 0.01 of an inch to about 0.03 of an inch.

11. The bubble of claim 1 wherein the concave surface of its outer ring has a radius in cross-section from about 0.09 of an inch to about 0.12 of an inch.

12. The bubble of claim 1 wherein the central dome (10), trough (18), the first frustum interconnecting the trough (18), the outer ring and the container wall (7) smoothly blend together.

13. A bubble (6) formed in a wall (7) of a plastic container, the container wall (7) defining an interior (14) of the container and having an interior surface (8), an exterior surface (9) and a wall thickness (29) and being suitable for containing a liquid under pressure, the bubble (6) comprising:

a central dome (10) defining a convex outer surface (11) recessed below the exterior surface (9) of the container (7), the convex outer surface (11) facing toward an adjacent portion of the exterior surface (9) of the container wall (7) surrounding the bubble (6);

an annular trough (18) surrounding the central dome (10), the annular trough (18) having an annular concave surface facing the adjacent portion of the exterior surface (9) of the container wall (7) and being recessed below the central dome (10);

an annular outer ring (22) surrounding the annular trough (18) and connected to the container wall (7) surrounding the bubble (6), the annular outer ring (22) having an annular concave surface facing toward the interior (14) of the container (7);

a first frustum (16 or 20) connected between one of the central dome (10) and the annular trough (18) and the annular outer ring (22) and the annular trough (18); and the bubble (6) including the central dome (10), the annular trough (18), the annular outer ring (22) and first frustum (16 or 20) being integral with the container wall (7) and having a wall thickness generally equal to the thickness (29) of the container wall (7), whereby the bubble is resistant to deformation;

the central dome (10) has an inner surface concave to the interior and has a radius of about 0.16 of an inch to about 0.45 of an inch.

14. A plastic container suitable for containing a liquid under pressure and including at least one bubble (6) formed in a wall (7) of the plastic container, the container wall (7) defining an interior (14) of the container and having an interior surface (8), an exterior surface (9) and a wall thickness (29) and the at least one bubble comprising;

a central dome (10) defining a convex outer surface (11) recessed below the exterior surface (9) of the container (7), the convex outer surface (11) facing toward an adjacent portion of the exterior surface (9) of the container wall (7) surrounding the bubble (6);

an annular trough (18) surrounding the central dome (10), the annular trough (18) having an annular concave surface facing the adjacent portion of the exterior surface (9) of the container wall (7) and being recessed below the central dome (10);

an annular outer ring (22) surrounding the annular trough (18) and connected to the container wall (7) surrounding the bubble (6), the annular outer ring (22) having an annular concave surface facing toward the interior (14) of the container (7);

a first frustum (16 or 20) connected between one of the central dome (10) and the annular trough (18) and the annular outer ring (22) and the annular trough (18); and the bubble (6) including the central dome (10), the annular trough (18), the annular outer ring (22) and the first frustum (16 or 20) being integral with the container wall (7) and having a wall thickness generally equal to the thickness (29) of the container wall (7).

15. The container of claim 14 wherein the other of the central dome (10) and the outer ring (22) is connected to the trough (18) by way of a second frustum (16).

* * * * *

UNITED STATES PATENT AND TRADEMARK OFFICE
CERTIFICATE OF CORRECTION

PATENT NO. : 6,827,228 B2 Page 1 of 1
DATED : December 7, 2004
INVENTOR(S) : Cynthia Ann Headen et al.

It is certified that error appears in the above-identified patent and that said Letters Patent is hereby corrected as shown below:

Column 2,
Line 12, change "OBJECTS" to -- SUMMARY --.
Line 27, delete "SUMMARY OF THE INVENTION".

Column 3,
Lines 26, 28, 38 and 39, change "complimentary" to -- complementary --.
Line 26, after "trough" insert -- 18 --.
Line 27, after "20" insert -- , as shown in Fig. 4 --.
Line 27, after "addition" insert a comma.
Line 33, change "comprises" to -- comprising --.
Line 46, after "bubble" insert -- on --.

Column 5,
Line 24, after "transitions" delete "to".
Line 25, after "and" second occurrence, delete -- to --.
Line 28, change "convention" to -- conventional --.
Line 58, change "preferable" to -- preferably --.
Line 60, after "container" insert -- is --.
Line 61, after "liquid" insert -- and --.

Column 6,
Line 9, after "projection" delete -- 68 --.
Lines 10, 26 and 34, change "complimentary" to -- complementary --.

Signed and Sealed this

Fourth Day of October, 2005

JON W. DUDAS
*Director of the United States Patent and Trademark Office*